United States Patent [19]

Mash et al.

[11] 4,114,990

[45] Sep. 19, 1978

[54] LIQUID CRYSTAL ROTATOR

[75] Inventors: Derek H. Mash; William A. Crossland, both of Harlow; Joseph H. Morrissy, Dunmow, all of England

[73] Assignee: International Standard Electric Corporation, New York, N.Y.

[21] Appl. No.: 793,684

[22] Filed: May 4, 1977

[30] Foreign Application Priority Data

May 4, 1976 [GB] United Kingdom ............... 18155/76

[51] Int. Cl.² ............................................. G02F 1/13
[52] U.S. Cl. ..................................... 350/337; 324/96; 354/227; 350/340; 350/341; 350/153
[58] Field of Search ............... 350/337, 340, 341, 153; 354/227; 324/96

[56] References Cited

U.S. PATENT DOCUMENTS 3,854,793  12/1974  Kahn ...................................... 350/340
3,914,020  10/1975  Helfrich ................................ 350/340

FOREIGN PATENT DOCUMENTS 1,372,868  11/1974  United Kingdom.

Primary Examiner—Edward S. Bauer
Attorney, Agent, or Firm—John T. O'Halloran; Peter C. Van Der Sluys

[57] ABSTRACT

A cholesteric filled liquid crystal cell has one surface homeotropically aligned and the opposite surface homogeneous parallel aligned. Plane polarized light incident upon the homogeneous parallel aligned surface with its polarization plane parallel with or orthogonal to the alignment direction has its plane of polarisation rotated by an amount controllable by the application of an electric potential across the cell. This forms the active element of a simulated rotating pointer meter display having no moving parts and only a single pair of electrical inputs.

8 Claims, 4 Drawing Figures

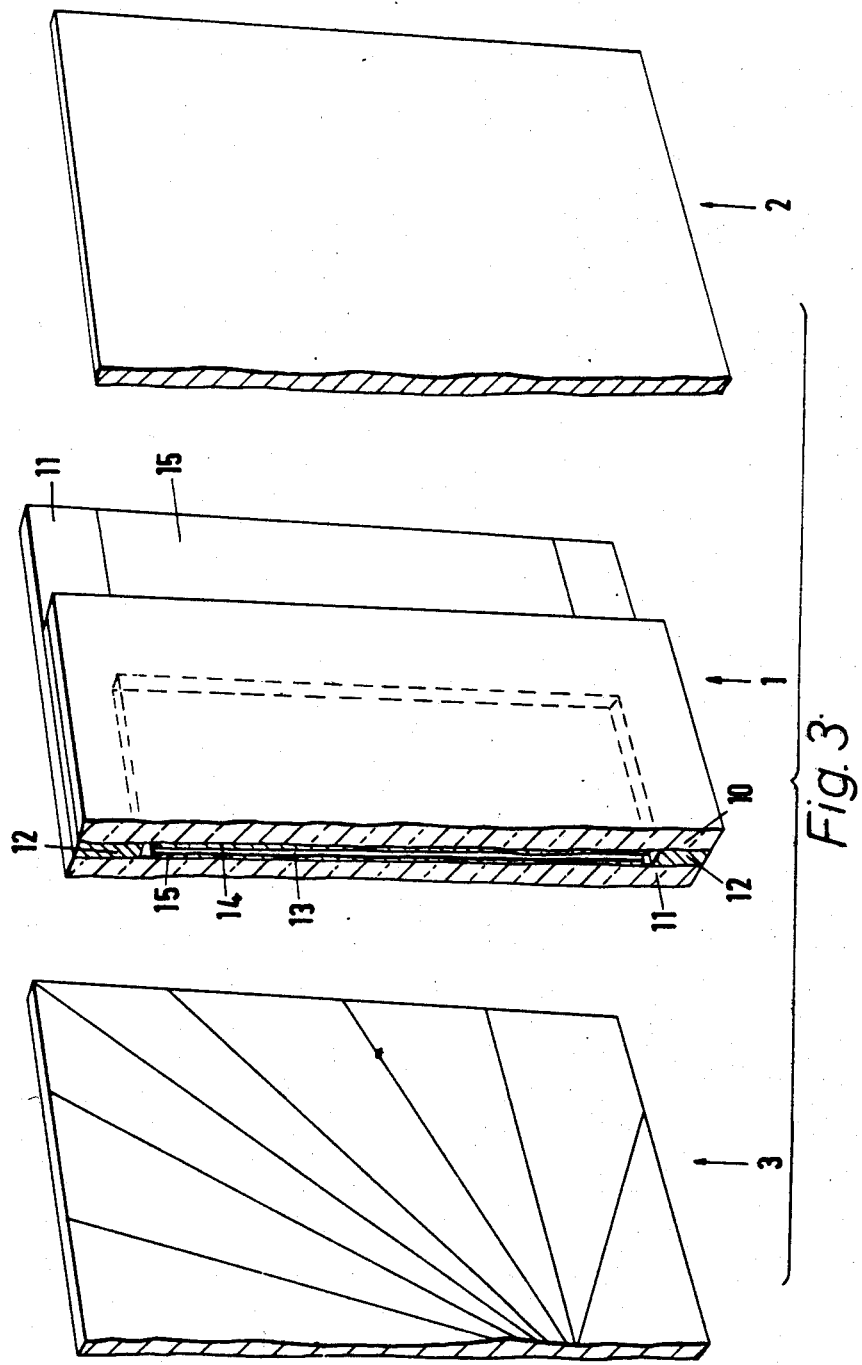

LIQUID CRYSTAL ROTATOR

FIELD OF THE INVENTION

This invention relates to cholesteric liquid crystal cells.

BACKGROUND OF THE INVENTION

The behavior of such cells having a thin layer of cholesteric medium normally depends in part upon the molecular orientation of the cholesteric layer at its major surfaces. Two particular types of alignment are 'homeotropic alignment' in which the molecules are aligned normal to the layer surface, and 'homogeneous alignment' in which they are aligned in the plane of the surface. In the case of homogeneous alignment this alignment will be termed homogeneous parallel alignment in the case where the alignment is in a particular direction in the plane of the surface.

SUMMARY OF THE INVENTION

According to the present invention there is provided a liquid crystal cell including a layer of cholesteric material having a pitch longer than the quotient of the wavelength of light divided by its birefringence, but not longer than four times the layer thickness, which layer is sandwiched between two transparent electroded plates one having a surface treatment providing, in the absence of an electric field across the layer, homeotropic alignment of the liquid crystal molecules adjacent said one plate, while the other plate has a surface treatment providing, in the absence of an electric field across the layer, homogeneous parallel alignment of the liquid crystal molecules adjacent said other plate.

Such a cell can be used to rotate the plane of polarisation of linearly polarised light transmitted through it. The amount of this rotation is controllable by establishing an electric field across the layer between the cell electrodes.

One application for such a cell is in the provision of a voltage controlled variable density optical attenuator. For this application plane polarised light is direct through the liquid crystal layer and then through a polarisation analyser.

Another application for such a cell is in the provision of a simulated moving pointer display device that in fact has no moving parts. Similarly for this application plane polarised light is directed through the liquid crystal layer and then through a polarisation analyser; but in this instance the analyser is a composite structure in which different portions have their polarisation directions aligned in different directions.

BRIEF DESCRIPTION OF THE DRAWINGS

FIG. 3 is an exploded diagram of a simulated moving pointer meter incorporating the cell of FIG. 1.

DESCRIPTION OF THE PREFERRED EMBODIMENT

Figure 1:
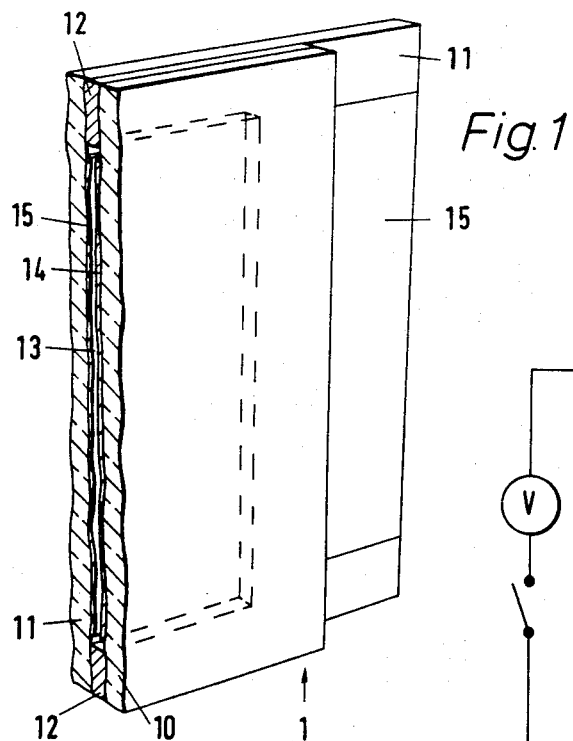
FIG. 1 is a part-sectioned view of the liquid crystal cell according to the invention.

Referring now in particular to FIG. 1, a liquid crystal cell 1 has a pair of glass sheets 10 and 11 that are secured together with a perimeter seal 12 to form an envelope filled with a thin layer 13 of a cholesteric medium. The composition of this medium is preferably chosen so that the thickness of the layer is at least half the pitch of the cholesteric helix but preferably not more than a few times that pitch. The upper limit of the cholesteric concentration is given by the Maugin Limit, $\lambda < P_o(n_e - n_o)$ where $P_o$ is the pitch of rotation an $n_e - n_o$ is the birefringence. This defines the shortest pitch that will guide plane polarised light of wavelength $\lambda$. The lower limit is set by the requirement that the cell shall provide an appreciable rotation of polarised light. The pitch of a particular cholesteric may be suitably lengthened by diluting it with a nematic, or by mixing together two cholesterics of opposite handedness. The two inner surfaces of the sheets 10 and 11 are provided with transparent electrodes 14, 15 typically formed of indium tin oxide.

Both electroded surfaces are provided with surface treatments designed to secure particular alignment of the cholesteric molecules in contact with them. One electroded surface is surface treated so as to provide, in the absence of an electric field across the cholesteric layer, substantially homeotropic alignment. One way of producing this alignment is to coat the surface with a suitable surfactant, such as hexadecyltrimethyl ammonium bromide. The other electroded surface is surface treated so as to provide, in the absence of an electric field across the cholesteric layer, substantially homogeneous parallel alignment. This homogeneous parallel alignment may be provided by providing a fine surface texture by rubbing or by oblique evaporation.

In the absence of the surface treatment providing homeotropic alignment, the molecules of the cholesteric layer would all lie substantially in the plane of the layer, but in different directions helically arranged according to their distance from the homogeneous parallel aligned surface.

This helical arrangement affects the propagation of light through the material. In particular, for plane polarised light that is incident normally upon one surface with its plane of polarisation aligned parallel with or orthogonal to the molecular alignment direction at the surface, the helical arrangement produces a rotation of the plane of polarisation by an amount dependent upon the twist of the helix.

Figure 2A:
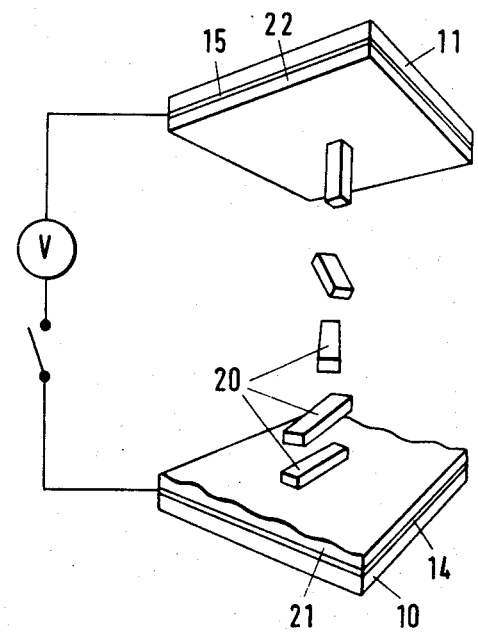
FIGS. 2a and 2b are diagrammatic representations illustrating the variation of molecular alignment direction through the thickness of the liquid crystal layer in the cell of FIG. 1.
Figure 2B:
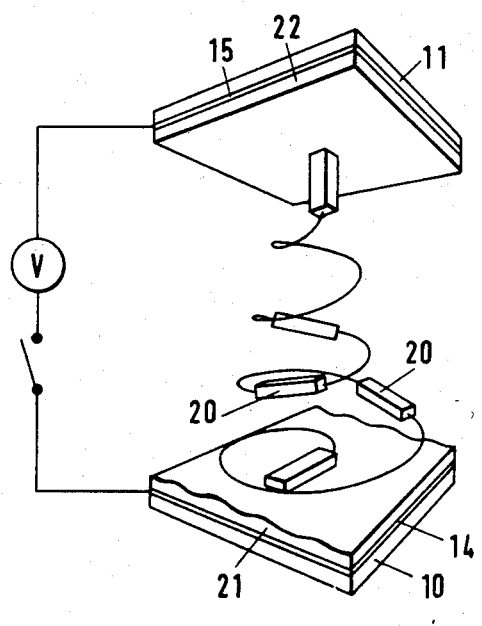

The surface treatment providing homeotropic alignment modifies the helical arrangement of molecules by causing some of them to be rotated out of the plane of the layer. The amount of this rotation increases monotomically with proximity to the homeotropic aligned surface where it reaches a maximum value of approximately 90°. This is illustrated diagramatically in FIGS. 2a and 2b depicting respectively the situation where the helix twist is about $\frac{1}{2}\pi$ and where it is several complete turns. In these figures the boxes 20 depict the orientations of the molecules at different planes in the liquid crystal layer confined between the sheets 10 and 11. Sheet 10 is the sheet provided with the surface treatment giving rise to parallel homogeneous alignment and the surface alignment is provided by layer 21. Layer 22 provides homeotropic alignment at the other sheet.

An effect of providing the homeotropic alignment surface treatment is to reduce the amount of twist that would otherwise occur in the helix, and hence the rotation of appropriately oriented plane polarised light propagating normally through the layer is also reduced.

The amount of twist is modified by the presence of an electric field extending through the thickness of the layer. If the layer exhibits positive dielectric anisotropy, the field will tend to promote homeotropic alignment at the expense of homogeneous alignment, and thus an increasing field will progressively reduce the twist. On the other hand, if the layer exhibits negative dielectric anisotropy, the field will tend to promote homogeneous alignment at the expense of homeotropic alignment, and thus an increasing field will progressively increase the twist.

Thus for the cell to act as an electrically controllable rotator of plane polarised light the light should be normally incident first upon the homogeneously aligned surface and should be incident with its plane of polarisation aligned with or orthogonal to the molecular alignment direction at that surface.

Referring now to FIG. 3, the cell of FIG. 1 is used as a meter display by locating it between two linear polariser sheets 2 and 3. Sheet 2, which is on the homogeneously aligned side of the cell, is a conventional linear polariser in which the polarisation direction is the same over the whole of its surface. This sheet is oriented with its polarisation direction aligned with the molecular alignment direction, or orthogonal to that direction. In the other sheet, sheet 3, the polarisation direction is a function of position in the sheet. A preferred arrangement of the variation of polarisation direction for sheet 3 is a radial arrangement in which the polarisation direction at every point in the sheet is along a line intersecting a single point in the plane of the sheet, but not necessarily on the sheet itself. Alternatively, instead of being aligned with the line, the polarisation direction may be aligned at a constant angle to this line. In the case of a sheet including all possible polarisation directions there will be one or more regions where the optical rotation imparted by the cell is such that the transmission of light through polariser sheet 2 and the cell is blocked by polariser sheet 3. If the optical rotation of the cell is then changed by changing the electric potential across the cell, then the transmission of light through the assembly is blocked at one or more different regions. In the case of the radial arrangement the transmission of light is blocked along a narrow angle sector whose orientation changes as the optical rotation of the cell changes.

The polariser sheet 3 is conveniently made by cementing together a mosaic of pieces cut from a conventional linear polariser sheet. In the case of the radial arrangement, the mosaic elements will be sectors of portions thereof. It may be noted that this produces a quantised output display instead of a truly continuous one but, unlike many other forms of quantised meter display, this display has only a single pair of electrode inputs to the display device itself. Clearly there are many possible alternatives to the radial arrangement, of which one is a linear arrangement in which the pieces forming the mosaic are parallel sided strips instead of sectors. In this particular instance inclination of the polarisation direction of the strip axis will change progressively from strip to strip.

The polariser sheet 2 may be dispensed with if the surface treatment used to provide homogeneous parallel alignment of the liquid crystal molecules is also used to align a layer of dichromophores thereby providing a linear polariser within the liquid crystal cell envelope.

By replacing the special linear polariser sheet 3 with a conventional linear polariser sheet (in which the polarisation direction is not a function of position in the sheet) there is produced a voltage controlled variable density optical attenuator.

If the angle between the polarisation directions of the two sheets is equal to the helix twist angle occurring in the absence of an applied field then the attenuation will begin to increase from a minimum value as the applied field increases from zero. Conversely, if one angle is the complement of the other, the attenuation will begin to decrease from a maximum value. Intermediate angular relationships may also be used for particular purposes.

One particular application for this sort of attenuator is in a camera with an electronic shutter in place of the conventional mechanical one. The attenuator can be operated as the non-mechanical shutter. In its operation as a shutter it will be noted that unlike the conventional twisted nematic shutter there is no switching threshold. For normal operation the drive voltage applied to open the shutter will be that necessary to change the rotation by 90° thereby changing the attenuation from maximum to minimum. Under conditions of very high ambient lighting where too much light would be admitted to the camera even with the shortest possible exposure the attenuator can be operated with a reduced voltage so that in its open condition its attenuation is reduced to an intermediate value. In this way the attenuator is made to function in place of an iris to regulate the amount of light entering the camera. When the camera is not in use a lens cap will normally be fitted.

We claim:

1. A liquid crystal cell including a layer of cholesteric material having a pitch longer than the quotient of the wavelength of light divided by the birefringence, but not longer than four times the layer thickness, which layer is sandwiched between two transparent electroded plates one having surface treatment providing, in the absence of the electric field across the layer, homeotropic alignment of the liquid crystal molecules adjacent said one plate, while other plate has a surface treatment providing, in the absence of an electric field across the layer, homogeneous parallel alignment of the liquid crystal molecules adjacent said other plate.

2. A simulated moving pointer meter incorporating a cell as claimed in claim 1 together with linear polarisation means on both sides of the layer, wherein the polarisation direction of the polarisation means on the homogeneously aligned side of the layer is aligned parallel with or orthogonal to the direction of homogeneous parallel alignment, and wherein the polarisation direction of the polarisation means on the homeotropically aligned side of the layer is a function of position over the surface of that layer.

3. A simulated moving pointer meter as claimed in claim 2 wherein said function of position is such as to provide a substantially radial arrangement of variation of polarisation direction.

4. A simulated moving pointer meter as claimed in claim 2 wherein said function of position is such as to provide a substantially linear arrangement of variation of polarisation direction.

5. A simulated moving pointer meter as claimed in claim 2, wherein the polarisation means on the homogeneously aligned side of the layer is provided by dichromophores aligned by the surface treatment that provides homogeneous parallel alignment of the liquid crystal molecules.

6. A voltage controlled variable density optical attenuator incorporating a cell as claimed in claim 1 together with linear polarisation means on both sides of the layer wherein the polarisation direction of the polarisation means on the homogeneously aligned side of the layer is aligned parallel with or orthogonal to the direction of homogeneous parallel alignment and wherein the polarisation direction of the polarisation means on the homeotropically aligned side of the layer is independent of position over the surface of the layer.

7. A voltage controlled variable density optical attenuator as claimed in claim 6 wherein the polarisation means on the homogeneously aligned side of the layer is provided by dichromophores aligned by the surface treatment that provides homogeneous parallel alignment of the liquid crystal molecules.

8. A camera incorporating a voltage controlled variable density optical attenuator as claimed in claim 6.

* * * * *